United States Patent [19]
Lee et al.

[11] Patent Number: 5,504,919
[45] Date of Patent: Apr. 2, 1996

[54] SORTER STRUCTURE BASED ON SHIFTABLE CONTENT MEMORY

[75] Inventors: Chen-Yi Lee; Jer-Min Tsai; Po-Wen Hsieh, all of Hsinchu, Taiwan

[73] Assignee: National Science Council, Taipei, Taiwan

[21] Appl. No.: 498,108

[22] Filed: Jul. 5, 1995

Related U.S. Application Data

[63] Continuation of Ser. No. 30,637, Mar. 12, 1993, abandoned.

[30] Foreign Application Priority Data

Feb. 19, 1993 [TW] Taiwan .................................. 82101162

[51] Int. Cl.$^6$ ......................................................... G06F 7/08
[52] U.S. Cl. ........................... 395/800; 395/821; 395/840; 364/DIG. 1
[58] Field of Search ..................................... 395/800, 840, 395/821; 364/362.1, 362.3, DIG. 1

[56] References Cited

U.S. PATENT DOCUMENTS

| | | | |
|---|---|---|---|
| 4,030,077 | 6/1977 | Florence et al. | 395/800 |
| 4,037,205 | 7/1977 | Edelberg et al. | 395/425 |
| 4,464,732 | 8/1984 | Clark | 395/800 |
| 4,595,995 | 6/1986 | Alles | 364/900 |
| 4,799,149 | 1/1989 | Wolf | 395/425 |
| 4,799,152 | 1/1989 | Chuang et al. | 395/800 |
| 4,852,020 | 7/1989 | Morita | 395/141 |
| 4,991,134 | 2/1991 | Ivsin | 395/800 |
| 5,068,822 | 11/1991 | Lawrence | 395/775 |
| 5,168,567 | 12/1992 | Everson et al. | 395/700 |
| 5,179,712 | 1/1993 | Abboud | 395/800 |
| 5,179,717 | 1/1993 | Sato et al. | 395/800 |

*Primary Examiner*—Alyssa H. Bowler
*Assistant Examiner*—Dzung C. Nguyen
*Attorney, Agent, or Firm*—Fish & Richardson

[57] ABSTRACT

An optimized high-speed sorter has a plurality of process elements connected in series. Each process element includes a sorting unit used to store a sorted item, and a comparing/controlling unit coupled to the sorting unit. In this sorter, all sorted items are compared with the input item simultaneously, and then are divided into an LE-group wherein the sorted items are less than or equal to the input item, and a G-group wherein the sorted items are greater than the input item. We assume that the sorted items are arranged in a descending sequence from left to right. In the insertion operation, the sorted items in the LE-group are shifted rightwards simultaneously, and the input item is loaded in the position between the LE-group and G-group. In the deletion operation, only the sorted items in the LE-group are shifted leftwards simultaneously. In order to accelerate the operation speed, the sorter adopts a pre-shift strategy.

14 Claims, 10 Drawing Sheets

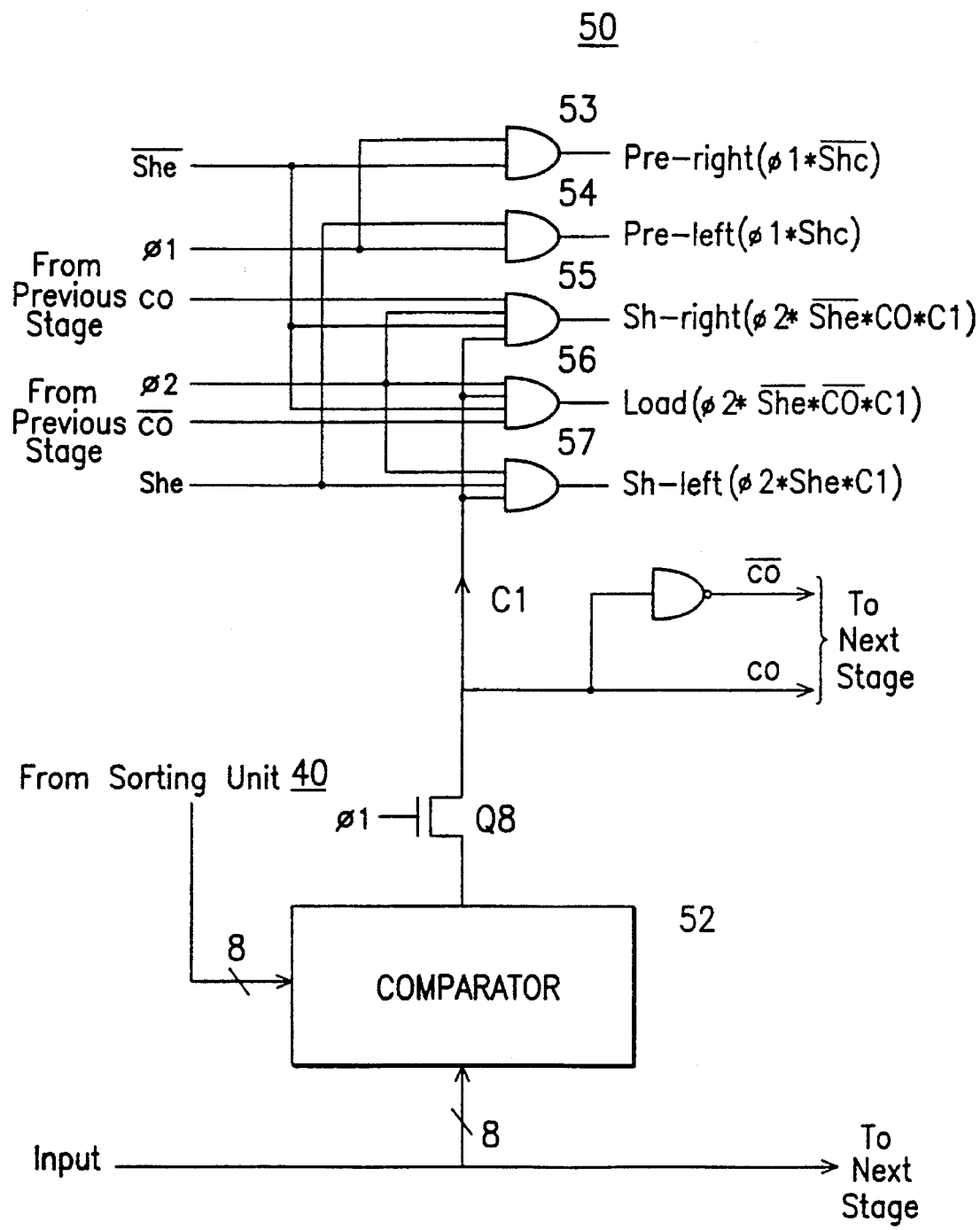
3b 5,504,919

1

SORTER STRUCTURE BASED ON SHIFTABLE CONTENT MEMORY

This is a continuation of application Ser. No. 08/030,637, filed Mar. 12, 1993, now abandoned.

BACKGROUND OF THE INVENTION

The present invention relates generally to a high-speed sorter, and more particularly to an optimized high-speed sorter which is a process element (PE) based structure, and can complete the deletion or insertion operation for a single input sample within one cycle.

At present, sorting plays an important role in many applications, such as data sorting, word processing, computer system design, signal processing, etc. Previously, the pertinent technologies mainly concentrated upon the software algorithm, such as the bubble sort, quick sort, and the like. If processing speed and data quantity are not important concerns, the sorting software perhaps can meet the user's requirements. However, since requirements for high-speed and large-quantity processing are increasing, the software solution no longer meets such requirements.

To solve this problem, several high-speed sorter approaches with hardware implementation have been proposed and developed. These high-speed sorter approaches have been mainly realized through the systolic array architecture, and the circuit designs which are well known in the art include the bubble sorter and ROS sorter (these designs could refer to J. Offen and R. Raymond, "VLSI Image Processing", McGraw-Hill, 1985; A. L. Fisher, "Systolic Algorithms for Running Order Statistics", in *Signal and Image Processing,* Dept. of Computer Science, Carnegie Mellon University, Pittsburgh, July 1981; and H. T. Kung, "Why Systolic Architectures", *IEEE Computer,* Vol. 15, no. 1, Jan., 1982). Though the bubble sorter is faster, and can process overlapping data, the number of its process elements, i.e. the size of the hardware implementation complexity, is proportional to the square of the number of input samples. In addition, the required values can only be obtained with a latency of N cycles, where N is the number of input samples. Although the hardware complexity of the ROS sorter linearly depends on the number of input samples (N), the latency remains the same as that needed in the bubble sorter. This latency of N cycles may not be allowed when real-time performance is concerned.

SUMMARY OF THE INVENTION

The primary object of the present invention is to provide an optimized high-speed and process element based sorter structure which can complete the deletion or insertion operation for a single input sample within one cycle.

Another object of the present invention is to provide an optimized high-speed sorter structure wherein the number of its process elements linearly depends on the number of input samples. Furthermore, when an input item is received, the sorted and stored items in all of the process elements are simultaneously compared with the input item in order to accelerate the deletion or insertion speed, so that the deletion or insertion of the input item can be achieved within one cycle.

In accordance with the present invention, an optimized high-speed sorter structure comprises:

a plurality of series-connected process elements, each process element being adapted to store a sorted item therein, the sorted items being arranged in a descending

2 sequence in a first direction, and in an ascending sequence in a second direction opposite to the first direction, and all of the process elements being adapted to simultaneously receive an input item in order to compare with their sorted items, each process element comprising:

a sorting unit having a buffer cell, and a storage cell connected in series to the buffer cell and adapted to store the sorted item therein; and a comparing/controlling unit coupled to the sorting unit, and adapted to receive the input item to compare with the sorted item stored in the storage cell in order to select one of a first, second, and third control-statuses; wherein when the optimized high-speed sorter structure is in an insertion step, the comparing/controlling unit of each process element controls the sorting unit to pre-shift the sorted item of the storage cell towards the first direction into its adjacent buffer cell, and the comparing/controlling unit controls the storage cell to maintain its sorted item in response to the first control-status, to replace its sorted item with the input item in response to the second control-status, and to replace its sorted item with the pre-shifted sorted item within its adjacent buffer cell in the second direction in response to the third control-status; and when the optimized high-speed sorter structure is in a deletion step, the comparing/controlling unit of each process element controls the sorting unit to pre-shift the sorted item of the storage cell towards the second direction into its adjacent buffer cell, and the comparing/controlling unit controls the storage cell to maintain its sorted item in response to the first control-status, and to replace its sorted item with the pre-shifted sorted item within its adjacent buffer cell in the first direction in response to the second and third control-statuses.

BRIEF DESCRIPTION OF THE DRAWINGS

The present invention can be more fully understood by reference to the following description and accompanying drawings, which form an integral part of this application:

FIG. 3b is a circuit diagram of a comparing/controlling unit of FIG. 2;

DETAILED DESCRIPTION OF THE PREFERRED EMBODIMENTS

Figure 1A:
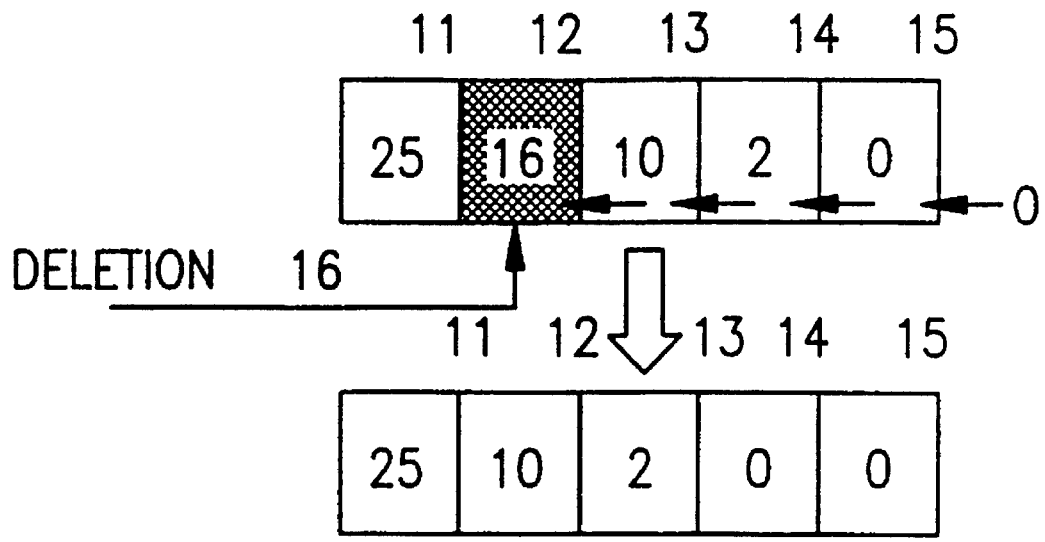
FIG. 1a is a schematic diagram illustrating the deletion operation of a sorter in accordance with the present invention.
Figure 1B:
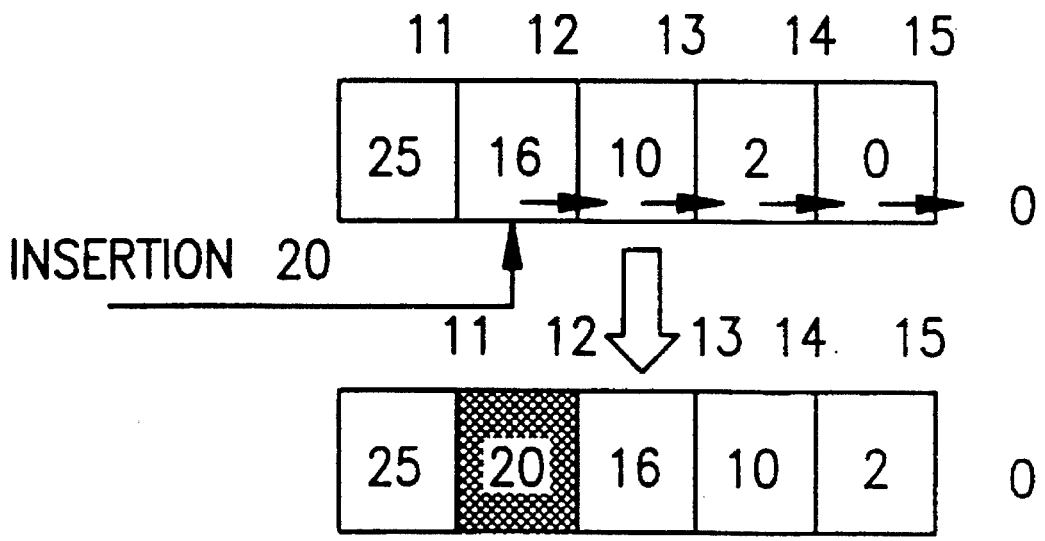
FIG. 1b is a schematic diagram illustrating the insertion operation of the sorter of the present invention.

Referring to FIGS. 1a and 1b, there are shown the deletion and insertion operations of the optimized high-speed sorter of the present invention. As shown in FIG. 1b, the optimized high-speed sorter of the present invention includes, for example, five process elements (PEs) 11 to 15 in which four sorted items or values (25; 16; 10; and 2) are stored, and an initialized item or value (0) is stored, respectively. When an input item or value (20) is inputted for insertion, the input item (20) is first compared with the sorted items (25; 16; 10; 2; and 0) within the PEs 11 to 15 simultaneously. Then, the sorted items are divided into two groups, i.e. an LE-group wherein the sorted item or items is less than or equal to the input item, and a G-group wherein the sorted item or items is greater than the input item. In this example, the LE-group includes the four sorted items in the PEs 12 to 15, and the G-group includes the one sorted item in the PE 11. Finally, all sorted items in the LE-group are simultaneously shifted rightwards, and the input item is stored in the position, i.e. PE 12, between the LE-group and G-group, so that the insertion operation is achieved as shown in the lower row of FIG. 1b. Referring to FIG. 1a, when an input item (16) is inputted for deletion, the input item is also compared with the sorted items within the PEs 11 to 15 simultaneously in order to divide the sorted items into two groups, i.e. the LE-group and G-group. Then, the sorted items of the LE-group are simultaneously shifted leftwards to achieve the deletion operation, as shown in the lower row of FIG. 1a.

In order to accelerate the operation speed of the circuit, and reduce the size of the produced integrated circuit, the present invention adopts the pre-shift strategy, and utilizes the shift register and carry lookahead designs. The strategy and relative circuits will be described in detailed hereinafter.

Figure 2:
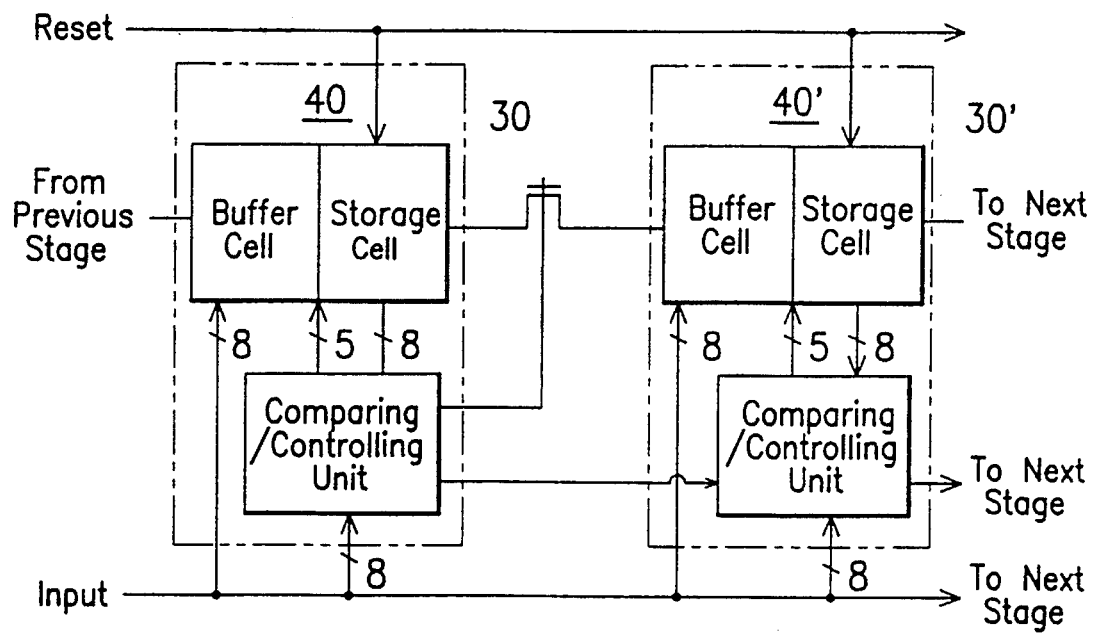
FIG. 2 is a block diagram of an optimized high-speed sorter structure in accordance with one preferred embodiment of the present invention.

With reference to FIG. 2, the optimized high-speed sorter of the present invention includes a plurality of series-connected PEs 30. The number of the PEs is linearly proportional to the number of the input items which are to be processed. For convenience, FIG. 2 only shows two PEs 30 and 30'. Each PE 30 includes a sorting unit 40 and a comparing/controlling unit 50 coupled to the sorting unit 40. Each sorting unit 40 includes a buffer cell 42 and a storage cell 46 coupled to the buffer cell 42.

Figure 3A:
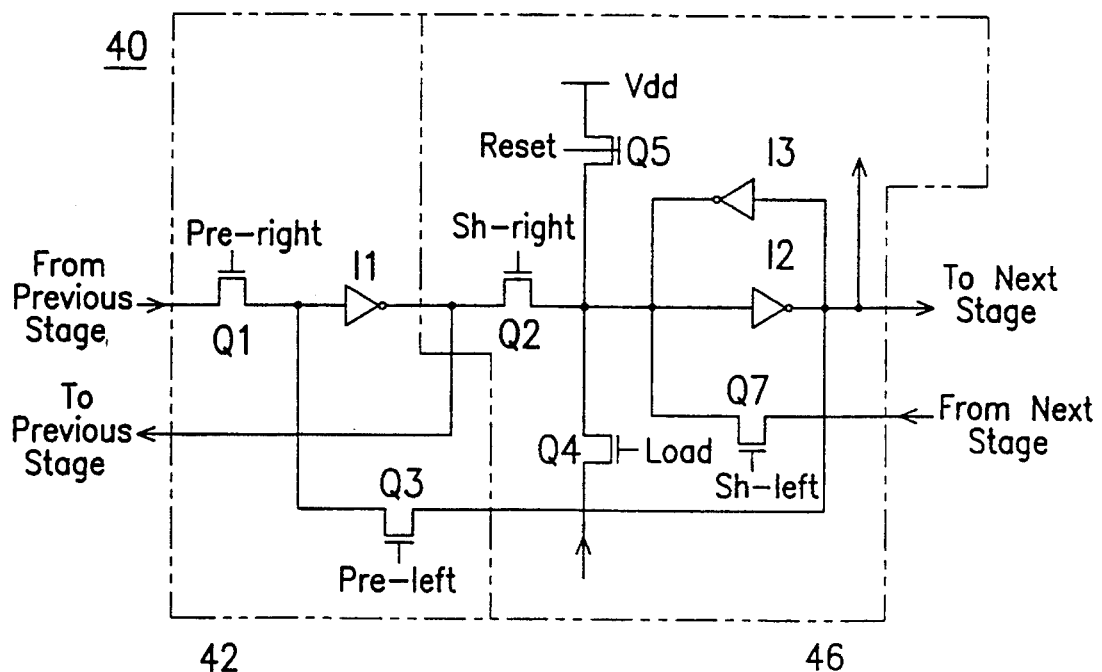
FIG. 3a is a circuit diagram of a single-bit sorting unit of FIG. 2.

Referring to FIG. 3a, there is shown a single-bit sorting unit 40 of FIG. 2 in accordance with one preferred embodiment of the present invention. It should be understood that the number of the single-bit sorting unit 40 of FIG. 3a can be extended in column direction depending on the bit number of the input data. The sorting unit 40 is constituted by two sets of shift registers, i.e. one set acts as the buffer cell 42, and the other set acts as the storage cell 46. To prevent the stored data from being lost, the storage cell 46 can be coupled to a weak inverter, for example an inverter I3 as shown in FIG. 3a. The control signals Pre-right, Sh-right, Pre-left, Load, and Sh-left for the gates of the transistors Q1, Q2, Q3, Q4, and Q7 shown in FIG. 3a are provided by the comparing/controlling unit 50 of FIG. 2. This will be further described hereinafter. The control signal Reset for the gate of the transistor Q5 is utilized to initialize the output of the PE as zero.

Referring to FIG. 3b, there is shown one preferred circuit embodiment of the comparing/controlling unit 50. The comparing/controlling unit 50 includes a comparator 52, and five AND gates 53 to 57. Whenever one input item to be processed is inputted, the comparator 52 of each PE 30 compares the input item with the sorted item within the sorting unit 40, and then outputs a signal C1. If the input item is greater than or equal to the sorted item, the signal C1 is "1". If the input item is less than the sorted item, the signal C1 is "0". Since the operation of the entire circuit is completed within one cycle, a first clock $\phi 1$ and a transistor Q8 are utilized to lock the output of the comparator 52, whereby the new sorted item in the PE will not change the signal C1 within the same cycle. The signal C1 is also sent to the next-stage PE to act as another signal C0. During the first clock $\phi 1$, the relationship between the input item and the sorted items of all PEs can be obtained according to the outputs of all comparators 52. Please note that the sorted items of the PEs, in this specification, are arranged in a descending sequence from left to right. In this way, the largest sorted item or value is stored within the leftmost PE. It should be understood that the sorted items may be arranged in an ascending sequence from left to right if desired.

The signals which are needed to be inputted into the comparing/controlling unit 50 from external include the first and second clocks $\phi 1$ and $\phi 2$, a signal Shc which is used to determine the execution mode of the high-speed sorter ("0" represents the insertion operations and "1" represents the deletion operation), and the signal C0 sent from the previous-stage PE. The input signals of the AND gates 53 to 57 of the comparing/controlling unit 50 are shown in FIG. 3b. The output signals of the AND gates 53 to 57 include Pre-right, Pre-left, Sh-right, Load, and Sh-left, and are respectively sent to the gates of the transistors Q1, Q3, Q2, Q4, and Q7 of FIG. 3a. In this embodiment, the timing chart of the first and second clocks $\phi 1$ and $\phi 2$ is shown in FIG. 4c.

Figures 4A, 4C:
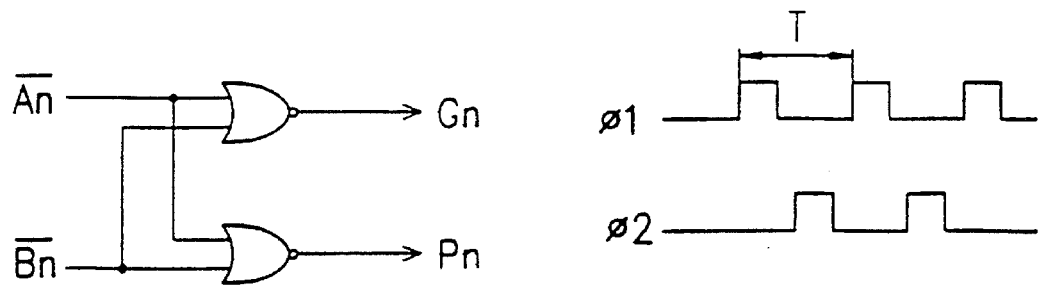
FIG. 4a is a logic circuit diagram illustrating the comparison of two single-bit data.
FIG. 4c is a timing chart of two clocks sent to the comparing/controlling unit as shown in FIG. 3b.
Figure 4B:
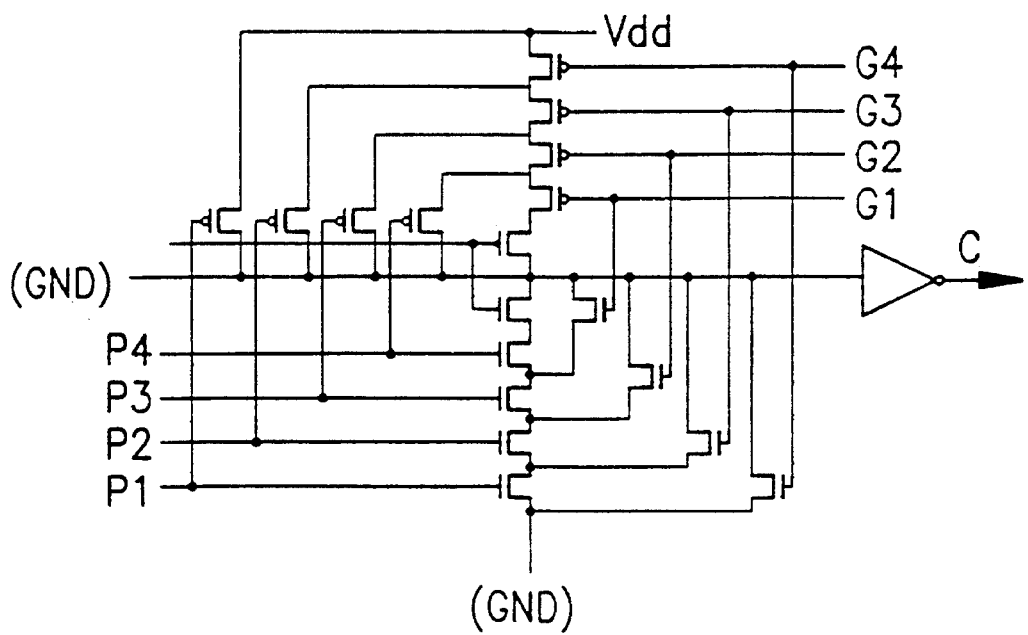
FIG. 4b is a circuit diagram of a four-bit comparator.

With reference to FIGS. 4a and 4b, there are shown a circuit implementing the comparator 52 of FIG. 3b. The counterparts (single bit) An and Bn of two data to be compared are inputted into the logic circuit as shown in FIG. 4a to generate the outputs Gn and Pn. Then, the signals Gn and Pn are inputted into the circuit as shown in FIG. 4b to generate a comparison resulting signal C. Since the circuits shown in FIGS. 4a and 4b are prior arts, it is not necessary to describe them further. It should be noted that the circuit of FIG. 4b is a four-bit comparator. If it is desired to compare a greater number of bits, it can be extended proportionally.

Hereinafter, the operation principle of the optimized high-speed sorter structure in accordance with the present invention will be described in detail.

In the insertion operation, the sorted items of the PEs which have a "0" output at the comparators are maintained because they are greater than the input item. The sorted items of the PEs which have a "1" output at the comparators are respectively shifted to their next or right-hand PEs. The input item is loaded into the position or PE which has a "1" output at its comparator, and the previous or left-hand PE of which has a "0" output at the comparator. In this manner, the insertion operation is completed. It should be noted that there are three kinds of control statuses determined by the outputs of the comparators in this embodiment of the present invention. The first control status is determined by the fact that the sorted item of the PE which belongs to the G-group is greater than the input item. The second control status is determined by the fact that the sorted item of one of the PEs which belong to the LE-group is less than or equal to the input item while the sorted item of its previous PE is greater than the input item. The third control status is determined by the fact that the sorted items of the other PEs which belong to the LE-group are less than or equal to the input item. In order to complete the insertion operation within the second clock $\phi 2$, the present invention utilizes the pre-shift strategy. During the first clock $\phi 1$, the sorted items of all PEs are respectively pre-shifted into the buffer cells of the next or right-hand PEs. During the second clock $\phi 2$, each PE is controlled by the comparing/controlling unit to maintain its sorted item, to replace its sorted item with the pre-shifted item within its buffer cell, or to load the input item in response to the output of the comparator or one of the three kinds of control statuses.

In the deletion operation, the comparators output the comparison results between the input item and sorted items of all PEs, and each PE pre-shifts its sorted item leftwards into its buffer cell during the first clock. During the second clock, each PE is controlled by the comparing/controlling unit to maintain its sorted item, or to replace its sorted item with the pre-shifted item within its next-stage or right-hand buffer cell, i.e. the original sorted item of the next-stage PE, in response to the comparison results. If the output of the comparator is "1", i.e. the above-described second and third control statuses, this means that the item to be deleted is in itself or one of its left-hand PEs. Therefore, the sorted items which are less than or equal to the input item are respectively replaced by the pre-shifted items within the right-hand buffer cells. If the output of the comparator is "0", i.e. the above-described first control status, this means that the item to be deleted is in one of its right-hand PEs. Therefore, the sorted items which are greater than the input item are maintained unchanged. In this manner, the deletion operation can be achieved.

Referring now to FIGS. 5 to 10, there are shown six operation conditions or steps of the sorting units. For the purpose of clearness, the components which are activated in respective steps are indicated by solid lines, while the components which are not activated in respective steps are indicated by phantom lines.

Figure 5:
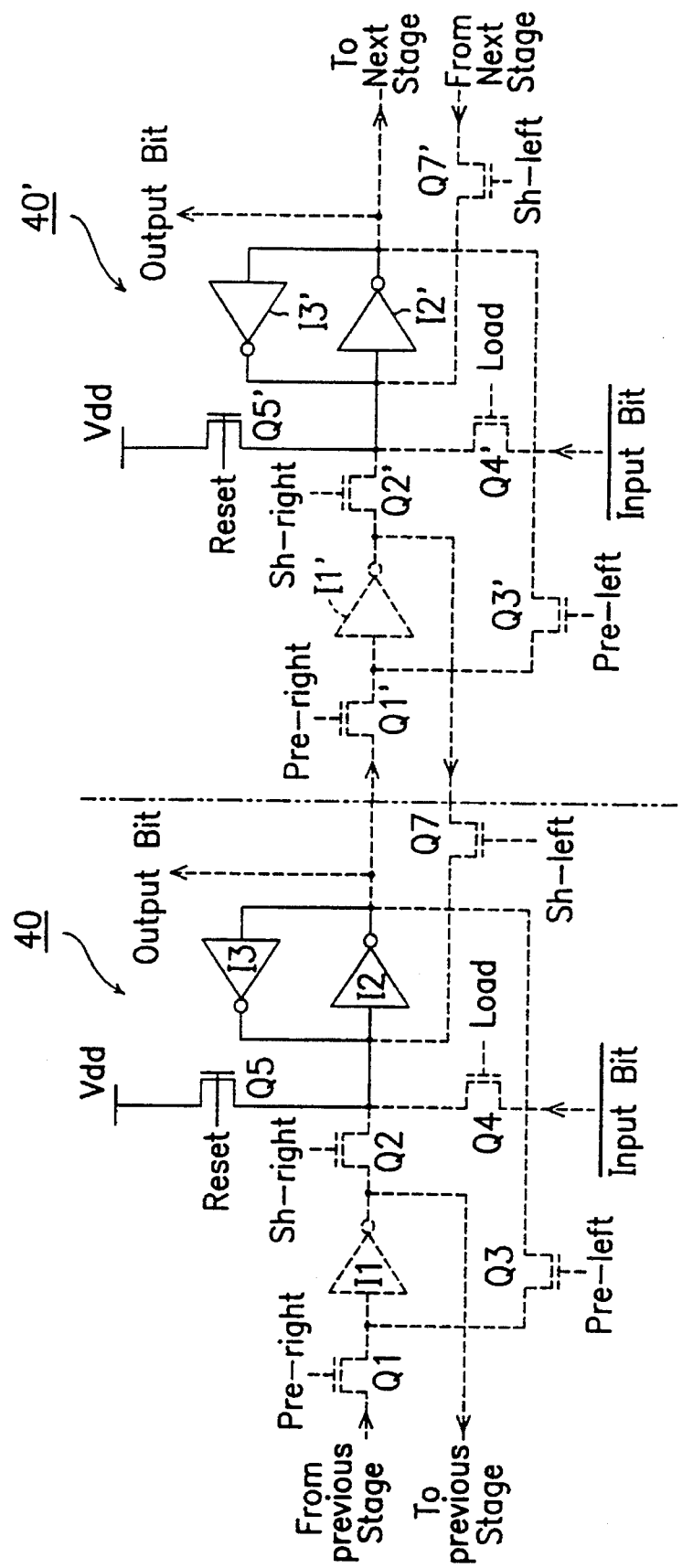
FIG. 5, FIG. 6, FIG. 7, FIG. 8, FIG. 9 and FIG. 10 are circuit diagrams of two series-connected sorting units of the present invention, illustrating six circuit operation conditions.

(1) Initialization (FIGS. 2 and 5)

When the Reset signal is "1", it means that the outputs of all PEs 30 or sorting units 40 are to be initialized to "0". In this step, the transistor Q5 is ON. Thus, the power source voltage Vdd is connected to the shift register, and all outputs are reset to "0" via the inverters I2 and I2'. The weak inverters I3 and I3' further assure the maintenance of the "0" state.

Figure 6:
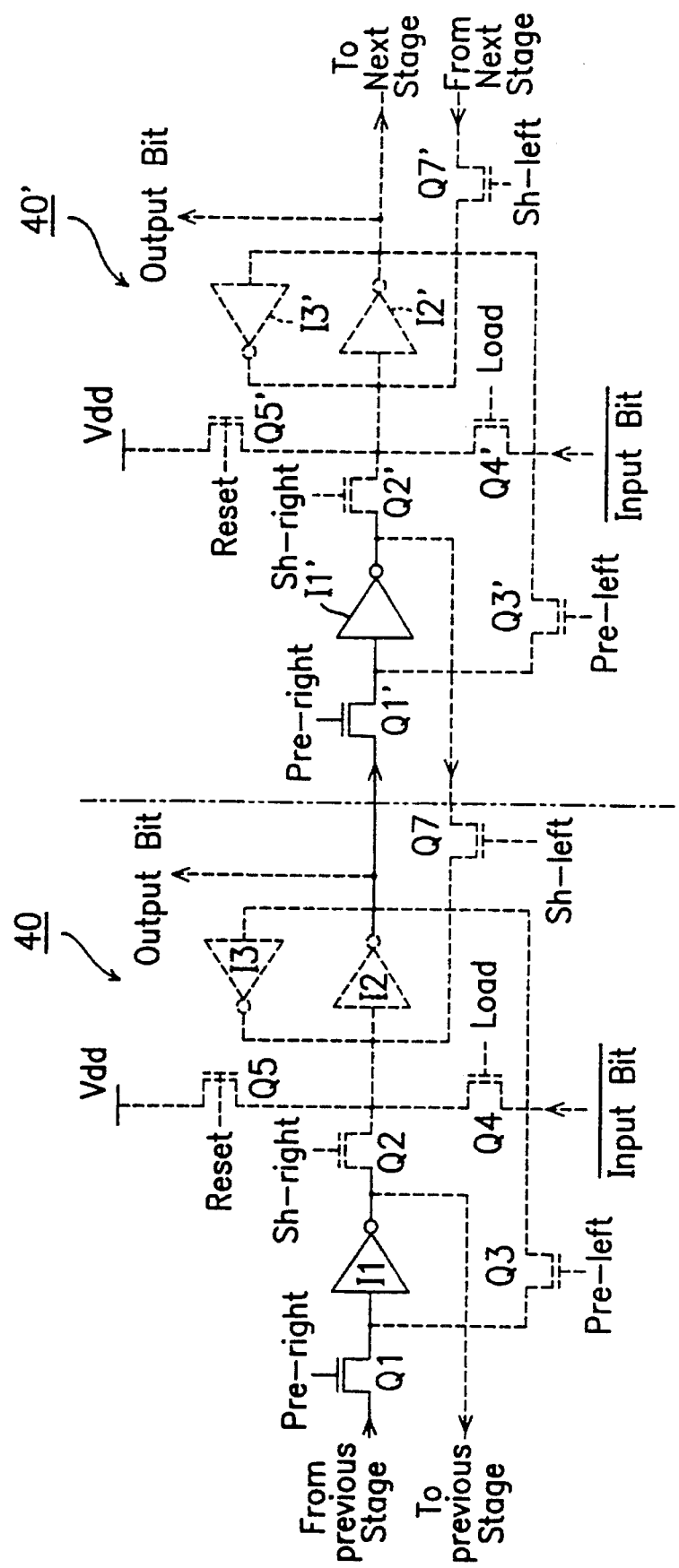

(2) Pre-shift Right (FIGS. 3b, 4c, and 6)

When the execution mode signal Shc is "0", it means that the high-speed sorter is in the insertion operation. When the first clock $\phi1$ is "1", the control signal Pre-right (Pre-right= $\phi1*\overline{Shc}$) will be "1" to turn on the transistor Q1. Thus, the sorted item of the previous sorting unit, for example, 40 is pre-shifted into the buffer cell I1' of the next sorting unit, for example, 40'. After the second clock $\phi2$ is turned to high, the comparing/controlling unit 50 will determine whether the pre-shifted item in the buffer cell I1' needs to be stored in the storage cell or inverter I2', and act as the new sorted item or not.

Figure 7:
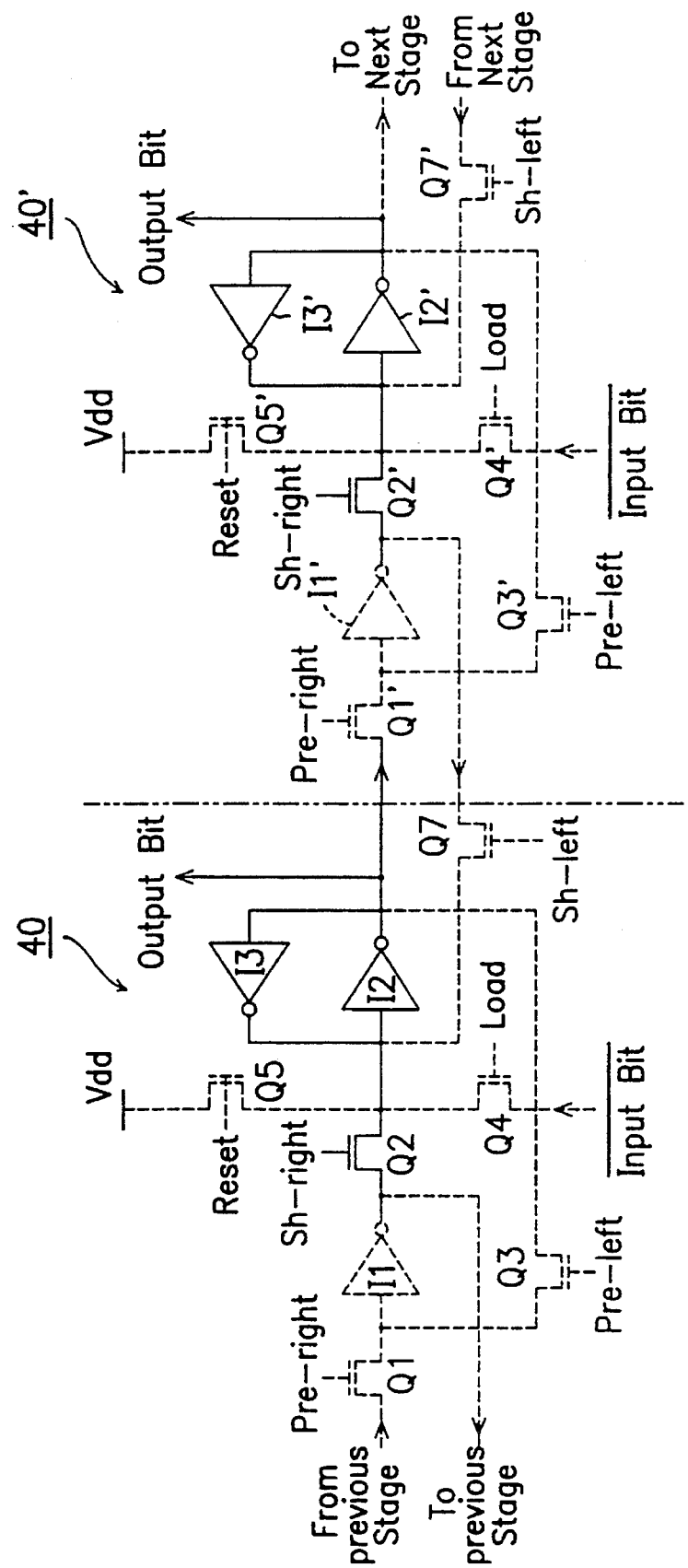

(3) Sorting (FIG. 3b, 4c, and 7)

If the output C1 of the comparator 52 of this stage is "1", and the output of the comparator of the previous stage, i.e. the signal C0 of this stage, is "1", it means that the sorted item of this stage is less than or equal to the input item, and the sorted item has to be shifted rightwards into the sorting unit of the next stage. Since the sorted item of the previous sorting unit 40 is pre-shifted into the buffer cell I1' of the next sorting unit 40' in the above step, when the second clock $\phi2$ is turned to high, the control signal Sh-right (Sh-right= $\phi2*\overline{Shc}*C0*C1$) will be "1" to turn on the transistor Q2. Thus, the pre-shifted item in the buffer cell I1' is inputted and stored into the storage cell I2'. In this way, all sorted items which are less than or equal to the input item are respectively and simultaneously shifted to the next or right-hand sorting units.

Figure 10:
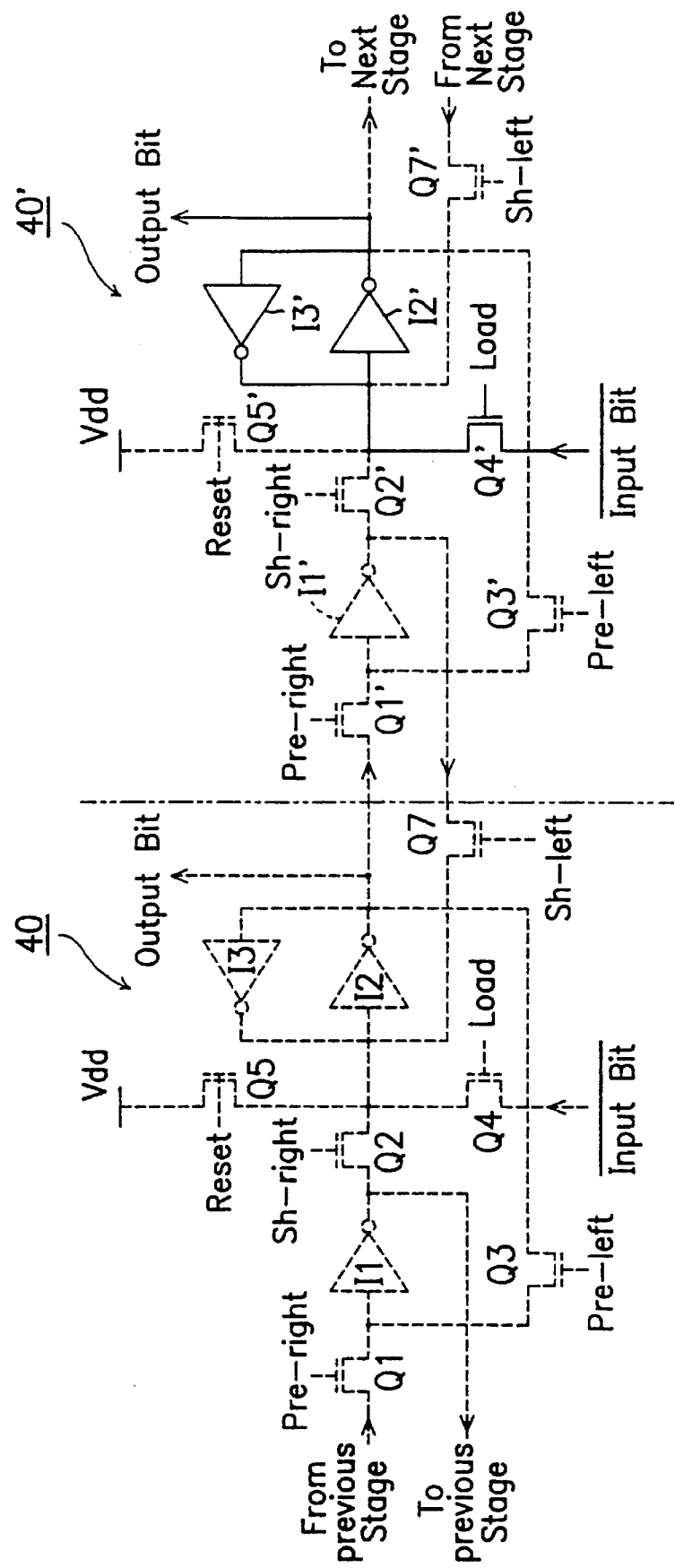

(4) Loading (FIGS. 3b, 4c, and 10)

If the input item is greater than or equal to the sorted item of the sorting unit 40' of this stage but less than the sorted item of the sorting unit 40 of the previous stage, i.e. C1="1" and C0="0" in this stage, it means that the sorting unit 40' is the correct position to load in the input item. When the second clock $\phi2$ is "1", the control signal Sh-right of the sorting unit 40' is "0", but the control signal Load (Load= $\phi2*\overline{Shc}*\overline{C0}*C1$) is "1" to turn on the transistor Q4'. Thus, the input item, not the pre-shifted item in the buffer cell I1', is stored in the storage cell I2'.

Figure 8:
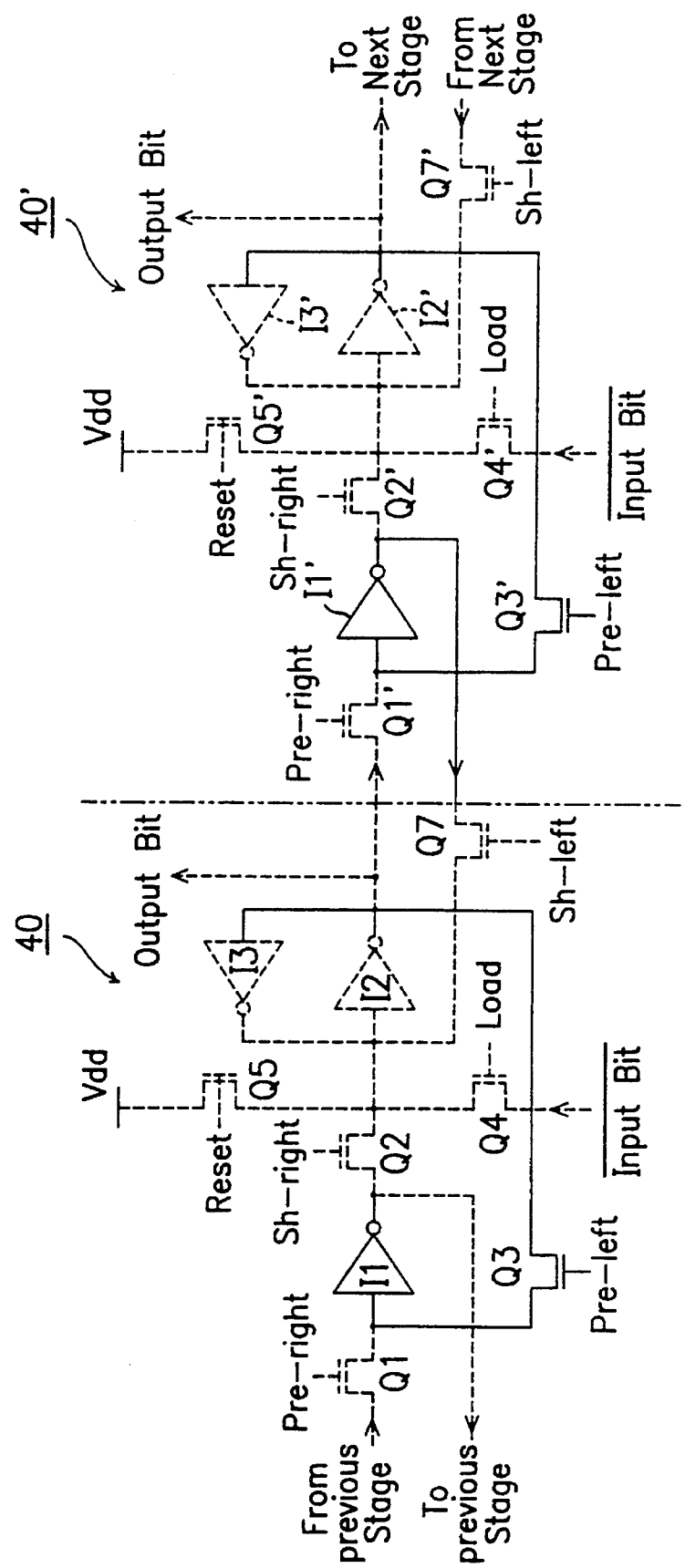

(5) Pre-shift Left (FIGS. 3b, 4c, 8)

When the execution mode signal Shc is "1", it means that the high-speed sorter is in the deletion operation. When the first clock $\phi1$ is "1", the control signal Pre-left (Pre-left= $\phi1*Shc$) will be "1" to turn on the transistor Q3. Thus, the sorted items in the storage cells I2 and I2' of the sorting units 40 and 40' are pre-shifted leftwards into the buffer cells I1 and I1'. After the second clock $\phi2$ is turned to high, the comparing/controlling unit 50 will determine whether the pre-shifted item in the buffer cell is needed to be stored into the storage cell of the previous or left-hand sorting unit, and act as the new sorted item or not.

Figure 9:
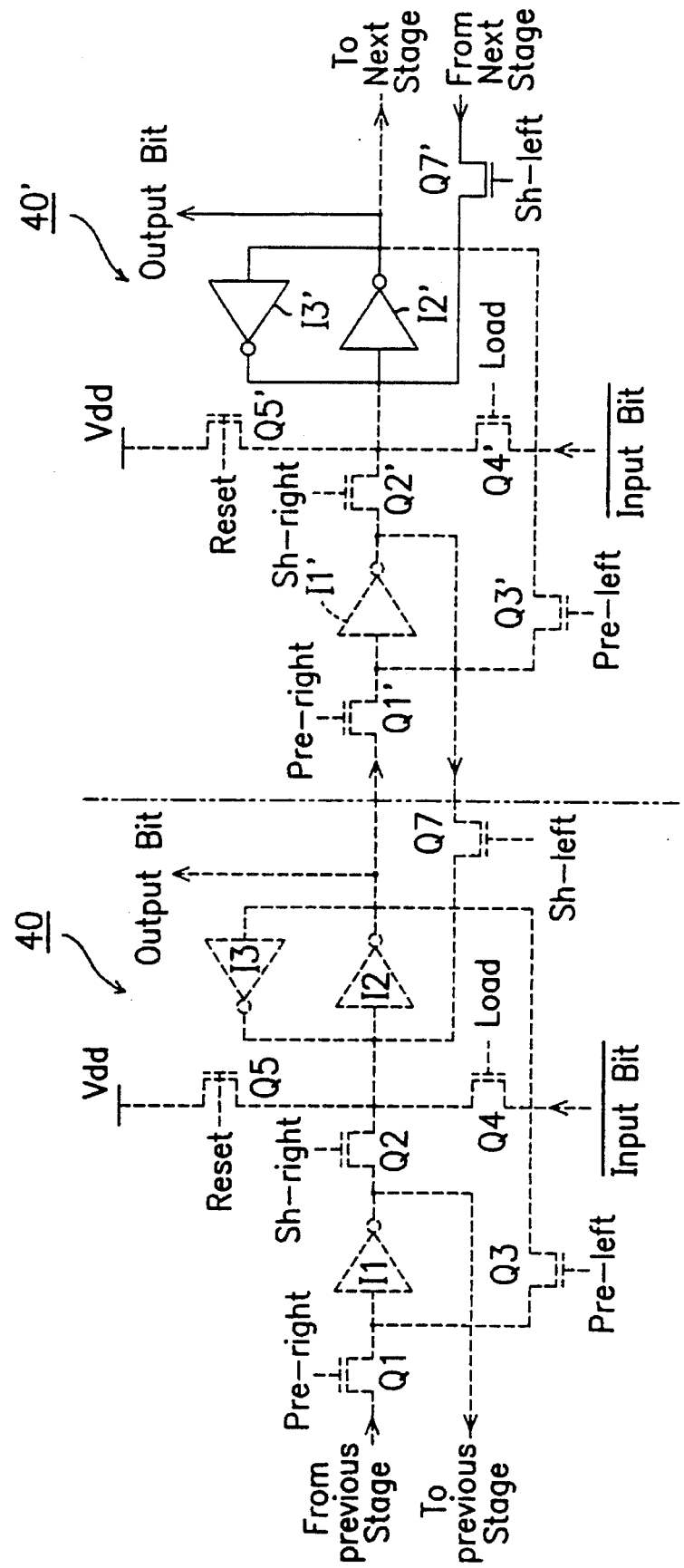

(6) Deletion (FIGS 3b, 4c, and 9)

In this step, the output C1 of the comparator 52 is utilized to determine whether the sorted item is replaced with the pre-shifted item in the buffer cell of the next or right-hand sorting unit. In FIG. 9, we assume that the signal C1 of the sorting unit 40 is "0" while the signal C1 of the sorting unit 40' is "1". This means that the sorted item to be deleted is stored in the sorting unit 40'. When the second clock $\phi2$ is "1", the control signal Sh-left (Sh-left=$\phi2*Shc*C1$) of the sorting unit 40' will be "1" to turn on the transistor Q7'. Thus, the pre-shifted item in the right-hand buffer cell (not shown) is stored in the storage cell 12' to act as the new sorted item. The sorting unit 40 keeps unchanged because its signal C1 is "0". In this way, the deletion operation is completed, and the new sorted sequence is formed.

According to the optimized high-speed sorter structure of the present invention, the following advantages can be achieved:

1. Optimized Function: The sorter of the present invention can complete the insertion or deletion operation for a single input item within one cycle T as shown in FIG. 4c. It has the shortest latency.

2. Good expandability: Since the process element of the present invention is constituted as a module, any number of the process elements can be easily connected in series to meet the number of the input items to be sorted. The number of the PEs is linearly proportional to the number of the input items.

3. High-efficiency circuit: The present invention can utilize just a simple and low-cost circuit to implement the PE structure, and to achieve the above-described optimized function.

4. High testability: The sorter of the present invention is constituted by the shift registers. If the sorter is manufactured as an integrated circuit (IC), a simple procedure is only needed to test the finished IC.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A sorter structure comprising:

a plurality of series-connected process elements configured to store a plurality of sorted items therein in a descending sequence in a first direction, and in an ascending sequence in a second direction opposite to said first direction, each process element comprising:

a sorting unit having a buffer cell and a storage cell that is connected in series to said buffer cell and is configured to store a corresponding one of said sorted items therein; and a comparing/controlling unit that is coupled to said sorting unit and is configured to receive an input item to compare with the sorted item stored in said storage cell in order to select one of first, second, and third control statuses, all of said comparing/controlling units having respective inputs that are coupled in parallel to concurrently receive an input item, said comparing/controlling units being configured to concurrently compare a received input item to items stored in the sorting units of corresponding processing elements;

wherein when the sorter structure is in an insertion step, said comparing/controlling unit of each process element controls the corresponding sorting unit to pre-shift said sorted item of said storage cell into the buffer cell of the sorting unit adjacent in said first direction, and said comparing/controlling unit controls said storage cell to maintain the sorted item of said storage cell in response to said first control-status, to replace the sorted item with said input item in response to said second control-status, and to replace the sorted item with said sorted item being pre-shifted within the adjacent buffer cell in said second direction in response to said third control-status; and when the sorter structure is in a deletion step, said comparing/controlling unit of each process element controls said sorting unit to pre-shift said sorted item towards said second direction into the buffer cell adjacent in said second direction, and said comparing/controlling unit controls said storage cell to maintain the sorted item in response to said first control-status, and to replace the sorted item with said sorted item being pre-shifted within the other adjacent buffer cell in said first direction in response to said second and third control-statuses.

2. A sorter structure based on shiftable content memory as claimed in claim 1, wherein after sorted items are compared with said input item, said process elements are divided into a first group of process elements wherein the sorted items in said first group of process elements are not greater than said input item, and a second group of process elements wherein the sorted items in said second group of process elements are greater than said input item.

3. A sorter structure based on shiftable content memory as claimed in claim 1, wherein each of said buffer and storage cells is constituted by a shift register.

4. A sorter structure based on shiftable content memory as claimed in claim 3, wherein each of said sorting units includes a weak inverter coupled to the storage cell thereof to prevent said sorted item stored within said storage cell from being lost.

5. A sorter structure comprising:

a plurality of series-connected process elements configured to respectively store a plurality of sorted items therein in a descending sequence in a first direction, and in an ascending sequence in a second direction opposite to said first direction, each process element comprising:

a sorting unit having a buffer cell, and a storage cell connected in series to said buffer cell and configured to store a corresponding one of said sorted items therein; and a comparing/controlling unit coupled to said sorting unit, and configured to receive an input item to compare with the sorted item stored in said storage cell in order to select one of first, second, and third control statuses, all of said comparing/controlling units being configured to concurrently compare said input item to the respective corresponding stored items;

wherein when the sorter structure is in an insertion step, said comparing/controlling unit of each process element controls the corresponding sorting unit to pre-shift said sorted item of said storage cell into the buffer cell of the sorting unit adjacent in said first direction, and said comparing/controlling unit controls said storage cell to maintain the sorted item of said storage cell in response to said first control-status, to replace the sorted item with said input item in response to said second control-status, and to replace the sorted item with said sorted item being pre-shifted within the adjacent buffer cell in said second direction in response to said third control-status; and when the sorter structure is in a deletion step, said comparing/controlling unit of each process element controls said sorting unit to pre-shift said sorted item towards said second direction into the buffer cell adjacent in said second direction, and said comparing/controlling unit controls said storage cell to maintain the sorted item in response to said first control-status, and to replace the sorted item with said sorted item being pre-shifted within the other adjacent buffer cell in said first direction in response to said second and third control-statuses;

wherein after sorted items are compared with said input item, said process elements are divided into a first group of process elements wherein the sorted items in said first group of process elements are not greater than said input item, and a second group of process elements wherein the sorted items in said second group of process elements are greater than said input item;

wherein in said insertion step, all comparing/controlling units of said second group of process elements group control said sorting units to maintain the sorted items thereof within each of said second group of process elements; one of said comparing/controlling units which belongs to said first process element group and is adjacent to said second process element group controls said sorting unit to replace said sorted item stored within the storage cell thereof with said input item; and the other comparing/controlling units belonging to said first process element group control said sorting units to respectively replace said sorted items stored within their storage cells with said pre-shifted sorted items within their adjacent buffer cells in said second direction.

6. A sorter structure based on shiftable content memory as claimed in claim 5, wherein in said deletion step, all comparing/controlling units of said second process element group control said sorting units to maintain the sorted items thereof; and all comparing/controlling units of said first process elements group control said sorting units to respectively replace said sorted items stored within their storage cells with said pre-shifted sorted items within their adjacent buffer cells in said first direction.

7. A sorter structure based on shiftable content memory as claimed in claim 6, wherein each of said process elements is configured to receive a reset signal in order to reset said sorted item.

8. A sorter structure based on shiftable content memory as claimed in claim 7, wherein each of said sorting unit includes a plurality of transistors coupled to said buffer cell and storage cell respectively, and the gates of said transistors being coupled to said comparing/controlling unit, and said reset signal respectively.

9. A sorter structure, comprising:

a plurality of cells arranged in a left-to-right neighbor-to-neighbor order, each cell comprising:
   a memory for storing a value;
   a shifter for shifting the value stored in said memory for storage in the memory of a neighboring cell, and receiving a shifted value from another neighboring cell for storage in the corresponding memory;
   a comparing unit having an input for receiving an input value and being configured to compare a received input value to the value stored in the corresponding memory, the inputs of said comparing units being coupled in parallel for concurrently receiving an input value, said comparing units being configured to concurrently compare a received input value to stored values respectively stored in the memory of corresponding cells, said comparing unit being further configured to produce one of a plurality of status signals indicative of whether said input value is greater than or less than the corresponding stored value; and
a control to control said cells, first to direct said cells to first concurrently compare said input value to the values stored in said memory cells, second to direct the shifter of those of said cells producing status signals from a predetermined subset of said plurality of said status signals to substantially concurrently perform said shifting, and third, to direct storage of said input value into the memory of one of said cells whose left and right neighbor comparing units produced non-matching status signals.

10. The sorter structure as claimed in claim 9, wherein each cell is configured to receive a reset signal in order to reset said stored values.

11. The sorter structure as claimed in claim 9, wherein each of said memory comprises a shift register.

12. The sorter structure as claimed in claim 11, wherein each of said sorting units includes a weak inverter coupled to the memory thereof to prevent said value stored within said storage cell from being lost.

13. The sorter structure as claimed in claim 9, further comprising:

a control configured to partition said cells into larger and smaller groups, said smaller group including all of said cells whose comparing unit produced a status value indicating that the corresponding stored value is less than said input value, and said larger group including those of said cells whose comparing unit produced a status value indicating that the corresponding stored value is greater than said input value, and all of said cells producing a status value indicating that the corresponding stored value is equal to said input value are grouped with one of said larger or smaller groups.

14. The sorter structure as claimed in claim 13, wherein said control directs the shifters of the cells of a first of said larger and smaller groups to perform said shifting, the memory of the cells of the second of said larger and smaller groups to retain the value stored therein, and directs the memory of the cell of said first group neighboring said second group to store said input value.

* * * * *